United States Patent
Weiser

(10) Patent No.: US 10,673,992 B1
(45) Date of Patent: Jun. 2, 2020

(54) METHOD AND SYSTEM FOR IMPLEMENTING IPV4 OR IPV6 IN A PROXY

(71) Applicant: FLASH NETWORKS, LTD, Herzliya (IL)

(72) Inventor: Adi Weiser, Givatayim (IL)

(73) Assignee: FLASH NETWORKS, LTD, Herzliya (IL)

( * ) Notice: Subject to any disclaimer, the term of this patent is extended or adjusted under 35 U.S.C. 154(b) by 572 days.

(21) Appl. No.: 14/852,682

(22) Filed: Sep. 14, 2015

Related U.S. Application Data

(60) Provisional application No. 62/057,359, filed on Sep. 30, 2014.

(51) Int. Cl.
*H04L 29/06* (2006.01)
*H04L 29/12* (2006.01)
*H04L 29/08* (2006.01)

(52) U.S. Cl.
CPC ........ *H04L 69/167* (2013.01); *H04L 61/6059* (2013.01); *H04L 67/141* (2013.01); *H04L 67/28* (2013.01)

(58) Field of Classification Search
CPC ..... H04L 29/06; H04L 61/251; H04L 67/322; H04L 67/325; H04L 69/167
USPC ......................................................... 709/228
See application file for complete search history.

(56) References Cited

U.S. PATENT DOCUMENTS

| | | | | |
|---|---|---|---|---|
| 7,984,163 | B2 * | 7/2011 | Almog | H04L 29/12066 370/386 |
| 9,438,494 | B2 * | 9/2016 | Samuell | H04L 43/0811 |
| 9,832,276 | B2 * | 11/2017 | Torres | H04L 67/28 |
| 2003/0225911 | A1 * | 12/2003 | Lee | H04L 29/12066 709/245 |
| 2006/0101153 | A1 * | 5/2006 | Boucher | H04L 29/06 709/232 |
| 2008/0212609 | A1 * | 9/2008 | Yoshimoto | H04L 69/16 370/466 |
| 2008/0285445 | A1 * | 11/2008 | Riddle | H04L 43/0882 370/230.1 |

(Continued)

OTHER PUBLICATIONS

RFC 6555, "Happy Eyeballs: Success with Dual-Stack Hosts," Internet Engineering Task Force, Standards Track, ISSN :2070-17221, Apr. 2002.*

*Primary Examiner* — David P Zarka
(74) *Attorney, Agent, or Firm* — Smith Tempel Blaha LLC; Gregory Scott Smith

(57) ABSTRACT

Controlling of a three-way handshake by a proxy server, while using dual-stack process. The proxy server is coupled between a plurality of surfer-equipment (SEs) and a plurality of webservers over IPv4 and/or IPv6 networks. The proxy server can obtain from a first SE, over the IPv6 network a first SYN packet that requests to establish a TCP connection over IPv6 with a first webserver. Next, the proxy server may check a list-of-webservers and determine whether a connection between the proxy-server and the first webserver over IPv6 will be established successfully. Accordingly, the server can determine whether to send a first SYN-ACK packet toward the first SE and send a second SYN packet over IPv6 toward the first webserver, or, to send the second SYN request over IPv4 toward the first webserver.

13 Claims, 8 Drawing Sheets

(56) References Cited

U.S. PATENT DOCUMENTS

| | | | |
|---|---|---|---|
| 2009/0304026 A1* | 12/2009 | Hamada | H04L 29/12358 370/466 |
| 2013/0103805 A1* | 4/2013 | Lyon | H04L 67/2814 709/219 |
| 2013/0103853 A1* | 4/2013 | Lyon | H04L 61/6086 709/238 |
| 2013/0136072 A1* | 5/2013 | Bachmann | H04W 4/70 370/329 |
| 2014/0321328 A1* | 10/2014 | Zuniga | H04W 8/06 370/254 |
| 2015/0195199 A1* | 7/2015 | Suryavanshi | H04L 45/741 370/352 |

* cited by examiner

METHOD AND SYSTEM FOR IMPLEMENTING IPV4 OR IPV6 IN A PROXY

FIELD OF THE DISCLOSURE

The present disclosure generally relates to the field of data communication over a packet switch network such as Internet Protocol (IP) packets. More particularly the disclosure relates to implementing IPv4 or IPv6 in a proxy.

DESCRIPTION OF BACKGROUND ART

Today, more and more users, systems and applications use the Internet for accessing a variety of different services, such as but not limited to web sites that offer access to different media files. A few non-limiting examples of files accessible through surfing include media files, such as ADOBE FLASH files, MICROSOFT SILVERLIGHT files, software files, documents, file sharing applications, etc. The files that are available for access and/or download can be embedded within web pages or they can be standalone files. A few examples of popular web sites that provide a wide variety of files for access, streaming, downloading, etc., include YOU-TUBE, GOOGLE and YAHOO, Windows-Update, Internet stores such as "App Store" the electronic shop of Apple Inc. USA, and many other web sites are also available for gaining access to such files.

As a result of the huge amount of websites and users the pool of the unallocated IPv4 addresses that can be allocated to new websites is exhausting. Consequently more and more IP service providers and operators move to the IPv6 IP address system. IPv4 stands for the Internet Protocol version 4 (IPv4), which is the fourth version in the development of the Internet Protocol (IP). IPv4 uses 32 bits addresses, which limits the address space to approximately 4.3 billion addresses. IPv6 stands for Internet Protocol version 6 is the latest version of the IP communication protocol that provides an identification and location system for computers on networks and routes traffic across the Internet. IPv6 uses a 128-bits address, allowing $2^{128}$, or approximately $3.4 \times 10^{38}$ addresses.

Today the communication over the Internet is in a transition of moving from IPv4 to IPv6. Consequently, there are many network devices that are not capable of using IPv6 or that their operation over IPv6 is not smooth and suffer from frequent failures. Network devices may be such as but not limited to gateways (GW), gatekeepers, routers, switches, etc.

In order to accelerate the adopting of IPv6 and to reduce the antagonism to implement unstable technique, a dual-stack technique is used. Dual-stack refers to side-by-side implementation of IPv4 and IPv6. Both protocols run on the same network infrastructure. Dual-stack technique is described in RFC 4213 and RFC 6555, the entire content of those RFCs are incorporated herein by reference. The dual-stack can be considered as a transitional technique to facilitate the deployment of IPv6. The ultimate objective of the dual-stack is to deploy the single stack of IPv6 globally.

A user that uses the dual stack technique tries to open two connections in parallel toward the same destination, a website for example. One connection uses the IPv4 version while the other uses the IPv6 version. In case that the connection over IPv6 succeeded then the connection over IPv4 is terminated and the communication proceed over the IPv6. If the connection over IPv6 fails, then the communication proceeds over the IPv4 connection. Along the description the terms website and webserver may be used interchangeably.

In case that a proxy is installed in between the user and the destination the dual-stack has some deficiencies. For example, a user that tries to establish a connection with a destination over an IP network opens the two TCP/IP connections, one over IPv4 and one over IPv6. The proxy obtains these two requests and responds over both, over IPv6 and IPv4. Thus, leading the user's device to terminate the connection over IPv4 while keeping the connection over IPv6. Substantially, in parallel, the proxy may try to set two TCP/IP connections (one over IPv4 and one over IPv6) with the destination. However, at this side of the proxy the IPv6 connection fails and only the IPv4 connection succeeded. Consequently, a full connection between the user, which is connected with the proxy over IPv6, and the destination, which is connected with the proxy over IPv4, cannot be established and the user has to start from the beginning.

BRIEF SUMMARY

The needs and the deficiencies that are described above are not intended to limit the scope of the inventive concepts of the present disclosure in any manner. The needs are presented for illustration only. The disclosure is directed to a novel technique for implementing dual stack technique in a proxy.

In order to avoid the deficiencies of the common technique, some example embodiments of a novel proxy can be configured to postpone the SYN-ACK response to the user until establishing a connection with the destination. The connection with the destination can be over IPv4 or IPv6. In case that the connection with the destination over IPv6 succeeded, then the proxy can respond, to the user, positively over IPv6. In addition, the proxy can hold the respond, over IPv4, by few milliseconds to few tens of milliseconds, 50 milliseconds for example, and then transfer the SYN-ACK over IPv4 toward the client.

Other embodiments, in addition to postponing the webserver's SYN-ACK over IPv4, may use an IPv6 webserver tables (WST). The WST can be used for storing a list of webservers that can communicate with the example of embodiment of the proxy over IPv6. Each entry in the webserver table can be allocated to a webserver and may use the webserver name and/or the webserver IPv6 address. In such embodiment the proxy can respond to a SYN request over IPv6 by checking the WST for an appropriate entry based on the IPv6 destination address. If an entry exists, then the proxy can respond with SYN-ACK to the client while sending a SYN request toward the webserver using the IPv6 address. Thus, accelerating the establishing of the connection over IPv6 and facilitating the option of using a cache by the novel proxy. If an entry was not found, then the proxy may transfer the IPv6 SYN toward the webserver and waits to a SYN-ACK from the webserver over IPv6 and only then may respond to the client with SYN-ACK over IPv6.

Other embodiments, in addition to postponing the webserver's SYN-ACK over IPv4, may use a non-IPv6 webserver tables (NIPv6WST). The NIPv6WST can be used for storing a list of webservers that cannot communicate with the example of embodiment of the proxy over IPv6. Each entry in the webserver table can be allocated to a webserver and may use the webserver name and/or the webserver IPv6 address. In such embodiment the proxy can respond to a SYN request over IPv6 by checking the NIPv6WST for an appropriate entry based on the IPv6 destination address. If an entry exists, then proxy can ignore the request to set a connection over IPv6 network. Thus, preventing spending of computing and communication resources. If an entry was not found in the NIPv6WST, then the proxy may transfer the IPv6 SYN toward the webserver and waits to a SYN-ACK from the webserver over IPv6. Only then the proxy may respond to the client with SYN-ACK over IPv6.

Other example embodiments of a novel proxy may operate in cooperation with the operator of the premises in which the novel proxy is installed. In such embodiment the operator can inform the proxy about any mobile device that requests an access to the Internet and the public IP addresses (over IPv4 and/or IPv6) that were allocated to that user. The user can be identified by its mobile-subscription-identification number (MSIN) or MISD or international-mobile-subscriber identity (IMSI), which is used in the access request, for example. The allocated public IP addresses, over IPv4, or IPv6 or both can be stored by the novel proxy. Such embodiment can implement a prediction method for predicting whether the connection over IPv6 to a certain destination will succeed and accordingly deliver the request to establish the connection toward the destination. Three different alternatives can be predicted: set the connection over IPv6, or set the connection over IPv4 or use the dual-stack and try to set a connection on both ways, one over IPv4 and one over IPv6. The destination response can be transferred over the appropriate connection to the user.

An example embodiment of an IPv6-predicting proxy (IPv6PP) may comprise an historical database (HDB). The HDB can be arranged as a list with a plurality of entries and columns. Each entry in the HDB can be associated with a destination website. Each entry can be associated with the website IP address and/or the website name. The columns can reflect the connections between the proxy and the relevant website (depending on each entry of the HDB).

Some example embodiments of IPv6PP may store in a first column the last date in which a connection to the relevant website was established. In a second column the number of requests to open a connection with the relevant website can be stored, a $3^{rd}$ column can store the amount of successful connections over IPv6, other column can store the amount of successful connection over IPv4, yet another column can include a prediction value for succeeding to open a connection over IPv6. In case that there are not enough observations (connections request to the relevant website) then the decision can be using the dual-stack for collecting more data on an appropriate type of connection IPv4 or IPv6. In case that a dual connection is selected, then a SYN-ACK over IPv4 can be postponed.

Other example embodiments of IPv6PP may limit the historical data according to the type of connection that was established in response to the previous request to a relevant website. In such embodiment the HDB may comprise less information. A first column, in such example embodiment, can be associated with the website and can comprise its name and/or IP address. The second column can include the date of the last request; a $3^{rd}$ column can point on the predicted type of connection. If the last successful connection was established over IPv6, then IPv6 can be pointed in this column. If IPv4 was used than IPv4 can be pointed. Some embodiments, from time to time PPv6PP may challenge the IPv4 selection by trying again to use an IPv6 or the dual connections in order to verify that IPv4 is the only way.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific exemplary embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE SEVERAL VIEWS OF THE DRAWING

Exemplary embodiments of the present disclosure will be understood and appreciated more fully from the following detailed description, taken in conjunction with the drawings in which.

DETAILED DESCRIPTION OF VARIOUS EMBODIMENTS

Turning now to the figures in which like numerals represent like elements throughout the several views, exemplary embodiments of the present disclosure are described. For convenience, only some elements of the same group may be labeled with numerals. The purpose of the drawings is to describe exemplary embodiments and not for production. Therefore features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present disclosure the terms task, method, process can be used interchangeably.

Figure 1:
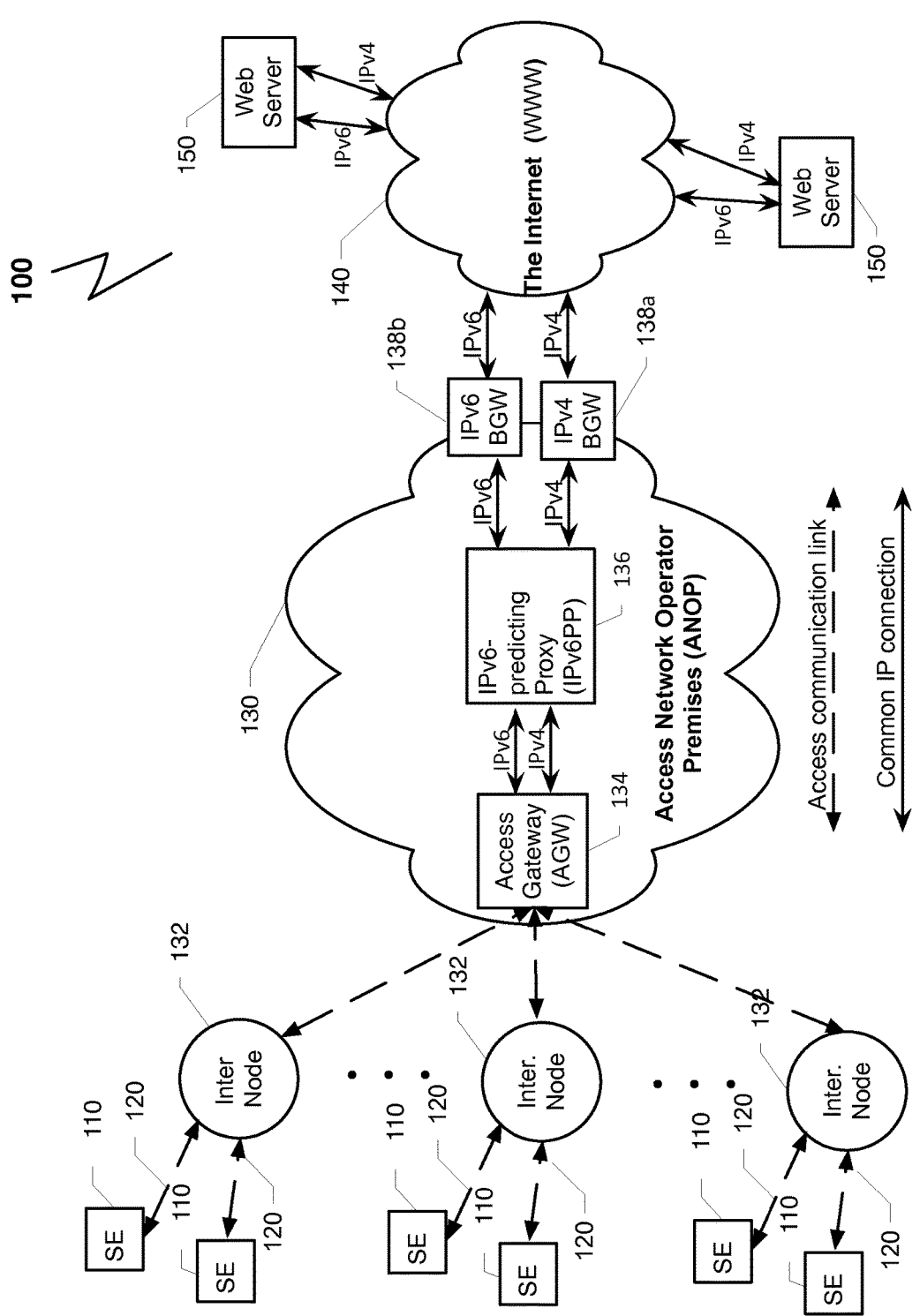
FIG. 1 illustrates a block diagram with relevant elements of an example Access Network Operator Premises in which an exemplary embodiment of the present disclosure can be implemented.

FIG. 1 depicts a block diagram with relevant elements of an exemplary communication system 100 in which an exemplary embodiment of the present disclosure can be implemented. Communication system 100 is configured to handle dual stack TCP/IP traffic. Network 100 can comprise an Access Network Operator Premises (ANOP) 130, a plurality surfer equipment (SE) 110, a plurality of intermediate nodes 132, and the Internet (WWW) 140 with a plurality of webservers 150. The ANOP 130 can be the premises of a cellular operator, a telecom operator, an Internet provider, a satellite communication service provider, a Public Switched Telephone Network (PSTN) operator, etc.

An ANOP 130 can provide different services to a plurality of different surfers (or to the surfer equipment SE utilized by a surfer) 110. A few non-limiting examples of typical surfer equipment (SE) 110 can be: a laptop, a mobile phone, a PDA (personal digital assistance), a computer, smart phone, a tablet computer, etc. Each SE 110 employs a browser application such as but not limited to Firefox (a trade name of Mozilla), Apple-Safari (a trade name of Apple Inc.), Google-Chrome (a trade name of Google Inc.), etc. An SE 110 can be connected to the AGW 134 through different communication links 120. The communication links 120 can be such as but not limited to, wireless links, wired links, ADSL links, cellular links, and so on.

A few non-limiting examples of services provided by an ANOP 130 can include: spam filtering, content filtering, bandwidth consumption distribution, transcoding, rating adaptation, etc. Among other elements an ANOP 130 may comprise an access gateway (AGW) 134, an IPv6-predicting proxy (IPv6PP) 136, an IPv4 border-gateway (BGW) 138a, and an IPv6 border-gateway (BGW) 138b. Among other tasks, an example of AGW 134 can be required to identify a requesting SE 110 at its ingress to the ANOP, to process the data traffic to and from the plurality of SEs 110 via one or more intermediate nodes 132. The intermediate nodes 132 depend on the type of the access network that is used. For LTE cellular network, the intermediate node 132 can be EnodeB; for GSM network the intermediate node 132 can be nodeB, etc. LTE stands for 3GPP Long Term Evolution, which is also referred as 4G cellular network.

In the direction from the SE 110 toward the webservers 150, the AGW 134 can be configured to retrieve the TCP/IP traffic from the data packet and according to the used protocol version (IPv4 or IPv6) the IP packets can be transferred toward the IPv6PP 136. A few non-limiting examples of an AGW 134 include: a GPRS-Gateway-Support Node (GGSN) in a GSM network, a PDSN in a CDMA network, etc. An exemplary ANOP 130 can be required to identify the subscriber an according can determine whether the subscriber is allowed to get the required access to the network and what services the subscriber is entitled to receive, for example. In addition, the AGW 134 may participate in a process of allocating one or more public IP addresses to the requesting SE 110 to be used in the current access session. Two IP addresses can be allocated, one over IPv4 and one over IPv6, allowing the SE 110 to use the dual-stack protocol while establishing a TCP/IP connection with a targeted webserver 150.

In some embodiments of the system 100 the IPv6PP 136 and the AGW 134 can be configured to inform the IPV6PP 136 about the two IP addresses (IPv4 and IPv6) that have been allocated to the same surfer ID. An example ID of a surfer can be the MISN, IMSI of its mobile device, for example. In such embodiment of system 100, the IPv6PP can be familiar that a certain Three-Ways handshake packets belong to a dual stack trial. Further, such embodiment may use a SE table (SET) in which the allocated public IP address can be stored.

The border gateway (BGW) 138a or 138b, at the output of ANOP 130 can be a dual-stack Internet Protocol router, for example. The BGW 138a can route IP data packets to and from the plurality of IPv4 webservers 150 via the Internet world-wide web (WWW). The BGW 138b can route IP data packets to and from the plurality of IPv6 webservers 150 via the Internet world-wide web (WWW). The BGW 138a&b can also be connected, not shown, to private packet data networks such as, but not limited to an intranet, LAN, WAN, etc. The communication between the BGW 138a&b and the packet data network 140 and/or private packet data networks can be based on Internet protocol version IPv4 or IPv6.

In addition to common operation as a proxy for the plurality of SEs 110, an example embodiment of IPv6PP 136 can be configured to handle dual-stack TCP/IP traffic in a novel way that improves and accelerate the process of establishing a TCP connection when the dual-stack technique is used by a requesting SE 110. Example embodiment of IPv6PP 136 can be configured to reduce the number of cases in which the connection between the proxy 136 and the requesting SE 110 was established over IPv6 while the continuation of the connection over IPv6 between the IPv6PP 136 and the webserver 150 fails and the connection between the proxy and the webserver 150 has been established over IPv4. Consequently, reduces the cases that a full connection between the user, which is connected with the proxy over IPv6, and the destination, which is connected with the proxy over IPv4, cannot be established and the user has to start from the beginning.

An example embodiment of IPv6PP 136 can be configured to postpone the SYN-ACK response to a requesting SE 110 until establishing a connection with the destination, a webserver 150. The connection with the webserver 150 can be over IPv4 or IPv6. In case that the connection with the destination is over IPv6, then the IPv6PP 136 can respond, to the requesting SE 110, positively over IPv6. If not, the proxy can hold the respond, over IPv4, by few milliseconds to few tens of milliseconds, 10, 20, 50 msec. etc. up to 100 milliseconds for example, and then transfer the SYN-ACK toward the requesting SE 110 over the IPv4 connection, via AGW 134.

Other embodiments, in addition to postponing the SYN-ACK over IPv4 as disclosed above, toward the requesting SE 110, may use an IPv6 webserver tables (WST). The WST can be used for storing a list of webservers 150 that can communicate with the example of embodiment of the IPv6PP 136 over IPv6. Each entry in the webserver table can be allocated to a webserver and may use the webserver name and/or the webserver IPv6 address. In such embodiment the IPv6PP 136 can respond to a SYN request over IPv6 by checking the WST for an appropriate entry based on the IPv6 destination address. If an entry exists, then the IPv6PP 136 can respond with SYN-ACK to the client while sending a SYN request toward the targeted webserver 150 using the IPv6 address. If an entry was not found, then the IPv6PP 136 may transfer the IPv6 SYN toward the webserver and waits to a SYN-ACK from the webserver over IPv6 and only then may respond to the requesting SE 110 with SYN-ACK over IPv6.

Other example embodiments of the IPv6PP 136 may operate in cooperation with the operator of ANOP 130. In such embodiment the operator can inform the IPv6PP 136 about any SE 110 that requests an access to the Internet and the public IP addresses (over IPv4 and/or IPv6) that were allocated to that requesting SE 110. In cases in which the ANOP 130 is used by a cellular operator, a SE 110 can be identified based on its mobile-subscription-identification number (MSIN) or MISD or international-mobile-subscriber identity (IMSI), which is used in the access request, for example. The allocated public IP addresses, over IPv4, or IPv6 or both can be stored by the novel proxy in a SE table (SET). The SET table is not shown in the figures. Such embodiment can implement a prediction method for predicting whether the connection over IPv6 to a certain destination will succeed and accordingly deliver the request to establish the connection toward the destination.

Three different alternatives can be predicted: set the connection over IPv6, or set the connection over IPv4 or use the dual-stack and try to set a connection on both ways, one over IPv4 and one over IPv6. The destination response can be transferred over the appropriate connection to the user.

Another embodiment of IPv6PP 136 may comprise an historical database (HDB). The HDB can be arranged as a list with a plurality of entries and columns. Each entry in the HDB can have a plurality of columns. A first one or two column can be allocated to the relevant webserver 150. It can contain the IP address or the webserver name (domain name). Those columns can be used as an index to that entry. Other columns can reflect the connections between the IPv6PP 136 and the relevant website (depending on each entry of the HDB).

Some example embodiments of IPv6PP 136 may store in a first column the last date in which a connection to the relevant webserver 150 was established. In a second column the number of requests to open a connection to the relevant website can be stored, a $3^{rd}$ column can store the amount of successful connections between the IPv6PP 136 and the webserver 150 over IPv6, other column can store the amount of successful connection over IPv4, yet another column can include a prediction value for setting a connection over IPv6 between the proxy and a requested web. Other column may store a prediction value for setting a connection over IPv4 between the IPv6PP 136 and a requested webserver 150.

Based on the information stored in the HDB a decision can be made whether to use IPv6 or IPv4 or both. The decision can be based on a prediction value that is obtained by calculating the probability of success to establish a connection over IPv6. In case that there are no enough observations (connections request to the relevant website) then the decision can be made to use the dual-stack for collecting more data on an appropriate type of connection IPv4 or IPv6. In case that a dual connection is selected, then a SYN-ACK over IPv4 can be postponed.

Other example embodiments of IPv6PP 136 may use a limited HDB. In such embodiment of IPv6PP 136 the HDB may comprise less information. A first column, in such example embodiment, can be associated with the website and can comprise its name and/or IP address. The second column can include the date of the last request; a $3^{rd}$ column can point on the predicted type of connection. If the last successful connection was established over IPv6, then IPv6 can be pointed in this column. If IPv4 was used than IPv4 can be pointed. Some embodiments of IPv6PP 136, from time may challenge the IPv4 selection by trying again to use an IPv6 or the dual connections in order to verify that IPv4 is the only way.

Another embodiment of IPv6PP 136 may combine the two prediction methods. The HDB can be similar to the embodiment of IPv6PP 136 that use probability calculation. During a first period of time, until collecting a plurality of connections between the IPv6PP 136 and a certain webserver 150, the predication column can point on the last successful connection over IPv4 or IPv6. After collecting enough number of observations, a predicting value for success can be calculated by calculating the probability of success and accordingly the decision for that entry (website) can be updated. More information on the operation of an example of IPv6PP is disclosed below in conjunction with FIGS. 3, 7 and 8.

Figure 2:
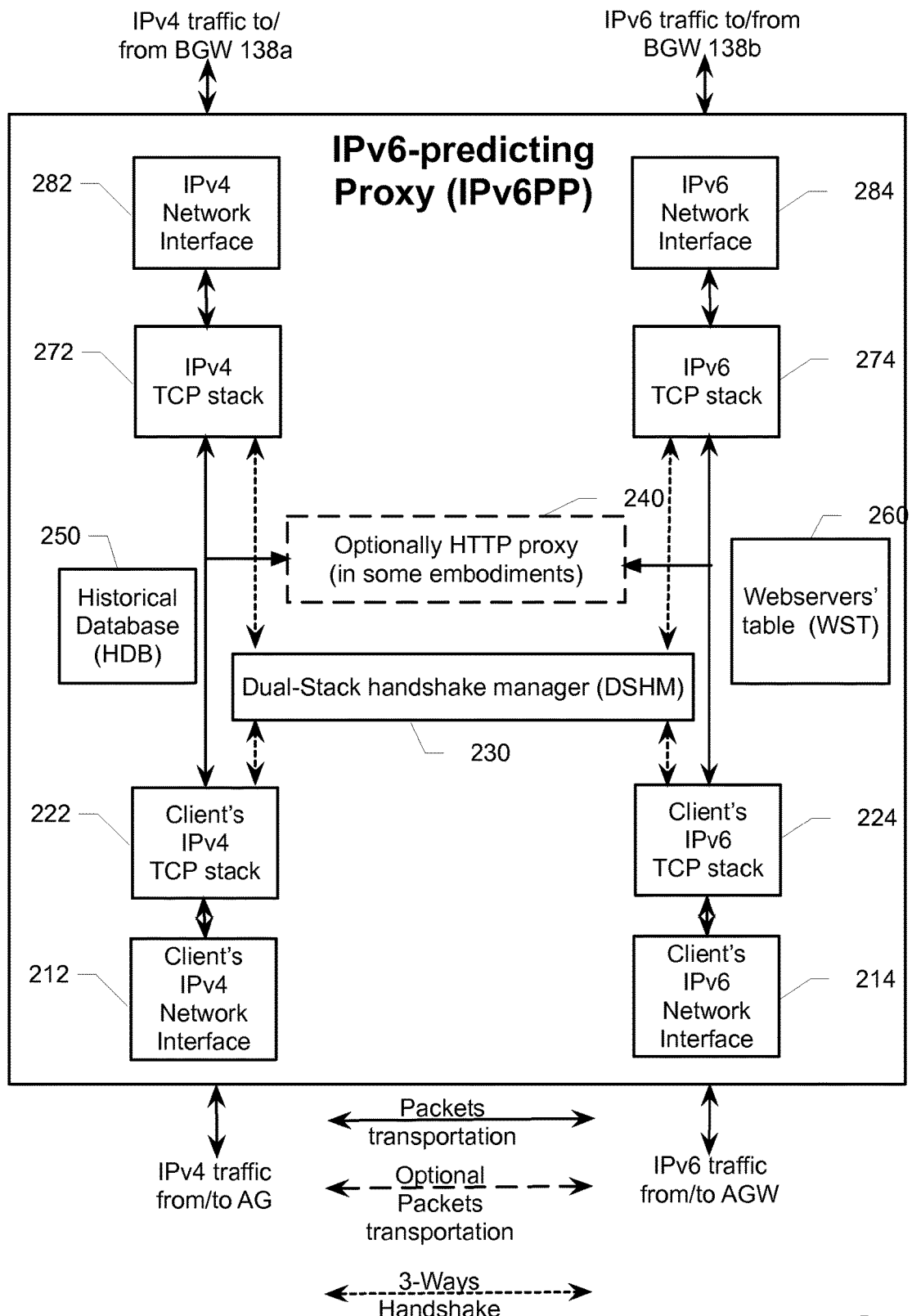
FIG. 2 illustrates a block diagram with relevant elements of an example of an IPv6-Predicting Proxy (IPv6PP), according to the teaching of the present disclosure.

FIG. 2 depicts a block diagram with relevant elements of an example embodiment of an IPv6-Predicting Proxy (IPv6PP) 200. An example embodiment of IPv6PP 200 may comprise one or more processors, computer readable medium such as a read/write hard disc, CDROM, Flash memory, ROM, or other memory or storage devices, etc. Software of a logical module may be embodied on one of the computer readable medium. In order to execute a certain task, a software program may be loaded to an appropriate processor as needed. An example of IPv6PP 200 can comprises an historical database (HDB) 250, a webservers' table (WST) 260, and a dual-stack handshake manager (DSHM) 230. Some embodiments of IPv6PP 200 may comprise also a HTTP proxy 240 or HTTP-Secure (HTTPS) proxy. HTTP proxy 240 can be configured to preform common operation of an HTTP proxy. Operation such as but not limited to content filtering, caching, compressing, etc. The operation of an HTTP or HTTPS proxy is well known to a person with ordinary skill in the art and will not be further disclosed.

In addition IPv6PP 200 may comprise two parallel channels, one over IPv4 and one over IPv6, for handling TCP data traffic between the plurality of SE 110 and webservers 150. At the side of the SE 110, the IPv4 channel may comprise an IPv4 network interface 212 and a client-IPv4-TCP stack 222. The IPv6 channel may comprise a IPv6 network interface 214 and a client-IPv6-TCP stack 224. Each one of the network interfaces 212 or 214 is configured to communicate with the AGW 134 over the appropriate network (IPv4 or IPv6).

Each one of the network interfaces 212 or 214 preforms common operation of a network interface. Operation such as but not limited to processing the first three layers of the Open Systems Interconnection model (OSI): the physical layer, the data link layer and the network layer. Packets from a SE 110 are obtained by the network interface 212 or 214, processed by the network interface 212 or 214 and at the end of the operation of the network interface, TCP/IP data segments can be transferred toward the relevant client's-IPv4 or IPv6 TCP stack 222 or 224. In the other direction TCP/IP data segments can be transferred toward the SE 110 via the appropriate network interface 212 or 214.

Common operation of the IPv4 network interface 212, the client-IPv4-TCP stack 222, the IPv6 network interface 214 and a client-IPv6-TCP stack 224 is well known to a person with ordinary skill in the art and will not be further described.

At the side of the webservers 150, the IPv4 channel may comprise an IPv4 network interface 282 and an IPv4-TCP stack 272. The IPv6 channel may comprise a IPv6 network interface 284 and an IPv6-TCP stack 274. Each one of the network interfaces 282 or 284 is configured to communicate with the BGW 138*a*&*b* over the appropriate network (IPv4 or IPv6). The operation of the four modules that faces the BGW 138*a*&*b* (282, 272, 284, 274) is similar to the operation of the four modules that faces the AGW 134 (212, 222, 214, and 224), respectively, and therefore will not be further disclosed.

In addition to common operation of a TCP stack, each one of the TCP stack (222, 272, 224 and 274), of the example embodiment of IPv6PP 200, is configured to transfer the 3-way handshake traffic toward the DSHM 230, for further processing. An example of the DSHM 230 is configured to handle the 3-way handshake in a novel way for improving the response to establishing a TCP connection while using the dual-stack method.

HDB 250 can be a computer readable medium such as a read/write hard disc, random-access-memory (RAM), a Flash memory, etc. that stores information about the connectivity between the IPv6PP 200 and the plurality of webservers 150 (FIG. 1). The HDB 250 can be arranged as a list with a plurality of entries and columns. Each entry in the HDB 250 can be associated with a destination website and stores the website IP address and/or the website name. The columns can reflect the success of connections between IPv6PP 200 and the relevant webserver 150 (FIG. 1) over IPv4 and/or IPv6.

The first column in the table of HDB 250 can store the website name or IP address, in IPv4 and/or IPv6. The second column can include the date of the last visit at that webserver; a $3^{rd}$ column can point on the predicted type of connection. In one embodiment of HDB 250, if the last successful connection was established over IPv6, then IPv6 can be pointed at the predicted column. If IPv4 was used than IPv4 can be pointed on the predicted column. From time to time, some embodiments of IPv6PP 200 may challenge the IPv4 selection by trying again to use an IPv6 or the dual connections in order to verify that IPv4 is the only way.

Other embodiments of IPv6PP 200 may store more information in the HDB 250. In such embodiment, the first column can store the webserver 150 name or IP address. One column can be allocated to addresses over IPv4, another column can be allocated to addresses over IPv6. A second column can store the number of requests to open a connection to the relevant website. A $3^{rd}$ column can store the amount of successful connections over IPv6. Another column can store the amount of successful connection over IPv4. In addition another column can include a prediction value for succeeding in establishing a connection between the proxy and a relevant webserver over IPv6. In case that there are not enough observations (connections request to the relevant website) for calculating the probability of success, then the column that was allocated to the probability can point on using both connections in order to collect more data on an appropriate type of connection IPv4 or IPv6. In case that the two connections are recommended, then a SYN-ACK over IPv4 can be postponed.

In order to accelerate the operation of IPv6PP 200, embodiment of IPv6PP 200 may use the WST 260 for storing information that is related to the current active webservers 150 that communicate with the SEs 110 via the IPv6PP 200. The WST 260 can store a portion of the HDB 250 that is related to the current active webservers 150. As in the HDB 250 each entry in the webserver table 260 can be allocated to a webserver and may store the webserver name and/or the webserver IP addresses (over IPv4 or IPv6). The WST 260 may have similar columns as the HDB 250. Per each request a relevant entry in the WST 260 can be searched. If an entry is found then, the entry is updated. If an entry was not found, then a new entry is allocated and the HDB 250 can be searched for the relevant entry. If an entry is found in the HDB, then the content of the entry can be copied to the new allocated entry in WST 260. If not, it means that this is the first request to that webserver. In that case the new entry may be allocated and the process can start without any historical data.

From time to time, the WST 260 can be searched, looking for old entries. An old entry can be an entry that the time interval from the last request, to its relevant webserver 150, is longer than a preconfigured period. The preconfigured period can be few tens of minutes for example. The content of found old entries can be fetched and be used to update the data in the relevant entry of the HDB 250. Then, the old entry can be released from the WST 260. In some embodiments, the HDB 250 and the WST 260 can reside in a single unit.

An example embodiment of DSHM 230 can be configured to manage the operation of IPv6PP 200. It may allocate entries and manage the HDB 250 as well as the WST 260. In addition the DSHM 230 can be configured to manage the process of establishing TCP/IP connection between at least one SE 110 and a webserver 150 over IPv4 and/or IPv6.

An example embodiment of DSHM 230 may be configured to handle the 3-way handshake traffic; SYN, SYN-ACK and ACK. The 3-way handshake traffic can be based on IPv4 or IPv6. An example of DSHM 230 can be configured to handle the 3-way handshake traffic without being aware whether the requesting SE 110 uses the dual-stack technique or not. Such embodiment of DSHM 230 can be configured to execute a blind-DSHM task in order to improve the utilization of the dual-stack technique. Another example embodiment of DSHM 230 can be configured to communicate with one or more entities of the ANOP 130 in order to obtain information about requesting SE 110 that request access to the Internet network 140 and obtain the IP addresses that were allocated to those requesting SEs 110. The allocated IP addresses can be over IPv4 or IPv6 or both (for dual-stack). More information on the operation of DSHM 230 is disclosed below in conjunction with FIGS. 3A-B, and FIGS. 4A-D.

Figure 3A:
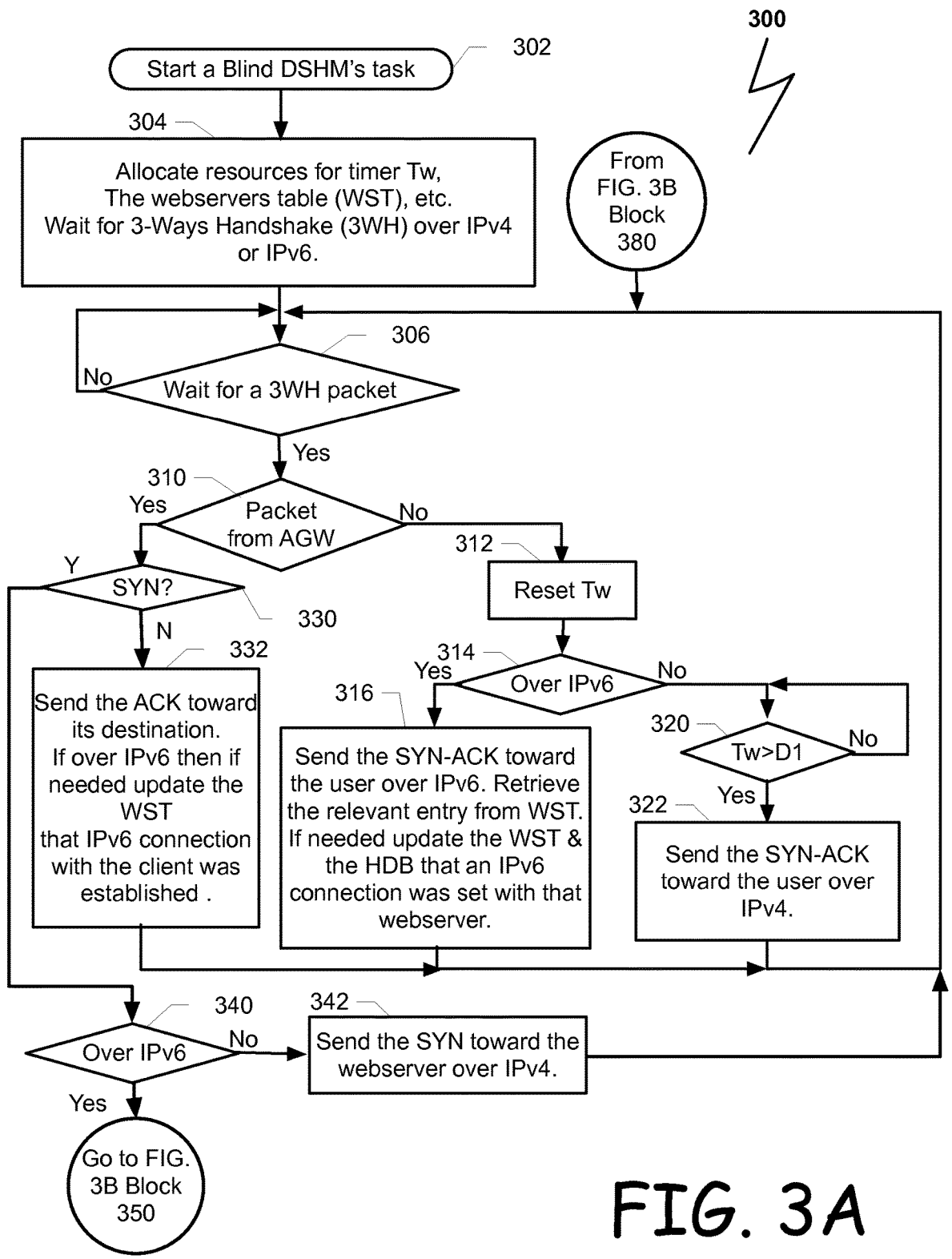
FIG. 3A-B illustrates a flowchart with relevant actions of a process that can be implemented by an example of a blind Dual-Stack-Handshake manager (DSHM), which is not aware that a user asks to access the network over IPv4 and IPv6.
Figure 3B:
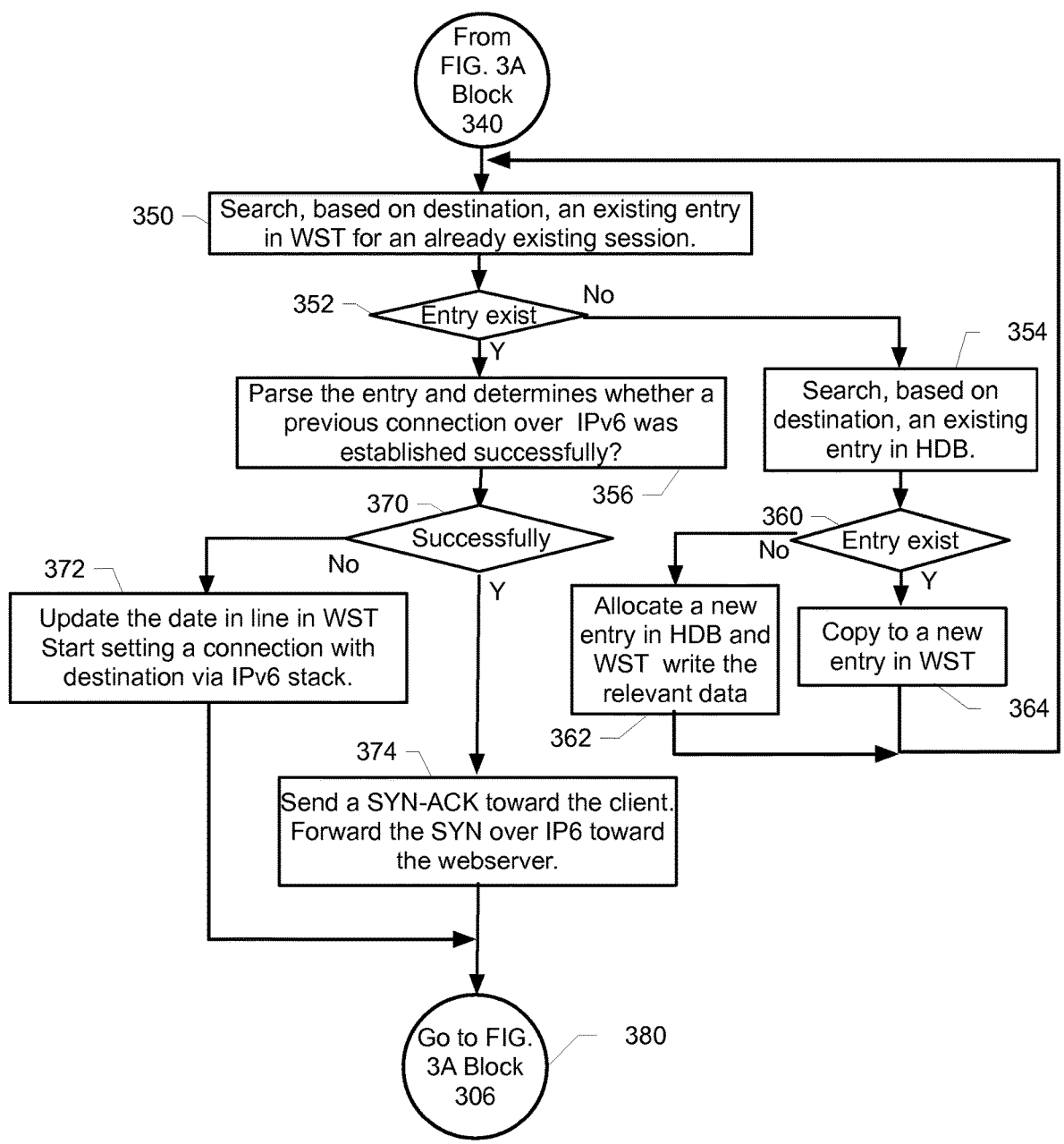

FIG. 3A and FIG. 3B illustrate a flowchart with relevant actions of an example of a process 300 that can be implemented by an example embodiment of a DSHM 230 that is not aware when a SE 110 is using a dual-stack protocol. Such an example of IPv6PP 200 can be referred as a blind DSHM. The blind DSHM's task 300 can be initiated 302 when IPv6PP 200 is initiated and can be active as long as IPv6PP 200 us active. After initiation, DSHM 230 can allocate 304 resources for relevant elements of IPv6PP 200 that are needed for managing the dual-stack handshake. Resources such as but not limited to a timer Tw that can be used for postponing the SYN-ACK response over IPv4. Timer Tw can be clocked by 1 millisecond clock for example. In addition storage resources can be allocated for storing the webservers table (WST) 260.

An example WST 260 that can be used by process 300 may have a plurality of entries (rows) and columns. Each row can be associated with a webserver that was successfully connected to IPv6PP 200 over an IPv6 network. The first one or two columns of WST 260 can store the IP address of the webserver and/or the webserver name, respectively. The next column can store the date of establishing the last TCP connection over IPv6 with that webserver.

Next, at block 306 process 300 can wait to obtain a three-way handshake (3WH) packet. The 3WH packet can be sent from one of the SE 110 and targeted toward one of the webservers 150 or vice versa. The packet can be carried over IPv4 or IPv6. Upon receiving 306 a 3WH packet, the packet can be parsed and a decision can be made 310 whether the packet was obtained from one of the SE 110 via AGW 134 or not. If 310 not, which means that the packet was obtained from a webserver 150 via BGW 138*a* or *b*, network interface 282 or 284, and TCP stack 272 or 274. A common 3WH packet that was sent from a webserver is a SYN-ACK, informing the SE 110 that the request to establish a connection with that web server is successfully accepted.

At block 312 timer Tw can be reset and process 300 can determine 314 whether the connection was set over IPv6. If not, it means that the packet was transferred over IPv4 via IPv4-network interface 282 and IPv-4-TCP stack 272, then at block 320 process 300 may wait until timer Tw will be larger than Dl. Dl can be few tens of milliseconds, 50 milliseconds for example. After waiting Dl milliseconds, the SYN-ACK packet can be transferred 322 toward its destination, the relevant SE 110, via client's-IPv4-TCP stack 222 and IPv4 network interface 212 and method 300 can return to block 306 for handling the next 3WH packet.

If 314 the 3WH packet was sent over IPv6, then based on the webserver (the source IP address) the relevant entry of the IPv6PPWST is retrieved 316 and be updated, if needed. The update can indicate that a connection between the relevant webserver 150 and the IPv6PP 200 was successfully established over IPv6 network. In some embodiments, in which IPv6PPWST has a date column, the date can be updated in order to indicate the last time in which the connection was successfully established over IPv6. Then, the SYN-ACK packet can be transferred 316 toward its destination, one of the SE 110, via client's-IPv6-TCP stack 224 and IPv6 network interface 214 and method 300 can return to block 306 for handling the next 3WH packet.

Returning now to block 310, if the 3WH packet is obtained from the AGW 134, then at block 330 a decision is made whether the packet is a SYN packet. If 330 not, which means that the 3WH is an ACK packet from a SE 110 that terminates the 3WH process, then at block 332 the ACK packet can be sent toward its destination, one of the webservers 150, via the appropriate IPv4 or IPv6 TCP stack 272 or 274 (respectively); IPv4 or IPv6 network interface 282 or 284 (respectively); and the appropriate BGW 138*a* or *b*. Then, method 300 can return to block 306 for handling the next 3WH packet. In addition, if the 3WH-ACK packet was obtained over IPv6, then at block 332 the WST 260 can be updated, indicating that the connection over IPv6 between the IPv6PP 200 and the relevant webserver 150 has been established successfully. This indication can be used for accelerating the following 3WH process over IPv6 of future requests from one of the SE 110 toward the relevant webserver 150.

If 330 the 3WH packet is a SYN packet obtained from a SE 110, then at block 340 a decision is made whether the packet is carried over IPv6. If 340 not, which means that the packet was obtained over IPv4, then at block 342 the SYN packet is sent toward its destination, one of the webservers 150. The packet can be sent via IPv4-TCP stack 272 and IPv4 network interface 282. Next, method 300 can return to block 306 for handling the next 3WH packet.

If 340 the 3WH SYN packet is carried over IPv6, then process 300 can proceed to block 350 at FIG. 3B. Searching 350 the WST 260 for an entry that is associated with the relevant webserver. The search can be based on the destination IPv6 address of the 3WH SYN packet. The search is for an entry that was allocated for a previous session of one of the SE 110 with that webserver.

If 352 there is no such an entry in WST, then the HDB 250 can be searched 354 for an entry that is related to the relevant webserver. If 360 an entry does exist in the HDB, then the entry can be retrieved and be copied to a new allocated entry in the WST and process 300 can return to block 350. If 360 an entry was not found in the HDB, then a new entry is allocated 362 in the HDB 250 and in the WST 260. Information from the SYN packet can be retrieved 362 and be written in the new entry at the HDB 250 and the new entry in the WST 260. Information such as the IPv6 address of the webserver, the webserver name, the date, etc. After loading the new entries, process 300 can return to block 350.

If 352 there is such an entry in WST, then the entry can be parsed 356 in order to determine whether a previous connection over IPv6 was successfully established. The date that is written in the entry can be updated. And a decision can be made whether 370 the connection was established successfully, then at block 374 a SYN-ACK packet can be sent toward the requesting SE 110 via Client's-IPv6-TCP stack 224, IPv6-network interface 214 and AGW 134 in order to accelerate the next step of the SE 110. The next step can be a GET request packet for example. In addition, a relevant SYN request can be sent 374 toward the relevant webserver 150 via IPv6-TCP stack 274, IPv6-network interface 284 and BGW 138*b*. After sending 374 the SYN packet toward the webserver, process 300 can return to block 306 (FIG. 3A) in order to handle the next 3WH packet in the queue.

If 370 the attempt to set a connection over IPv6 with that webserver was not successfully established, then at block 372 the date can be updated. In addition, a relevant SYN request can be sent 372 toward the relevant webserver 150 via IPv6-TCP stack 274, IPv6-network interface 284 and BGW 138*b*. After sending 372 the SYN packet toward the webserver, process 300 can return to block 306 (FIG. 3A) in order to handle the next 3WH packet that is waiting in the queue of DSHM 230.

FIG. 4A to FIG. 4D illustrate a flowchart with relevant actions of an example of a process 400 that can be implemented by an example embodiment of a DSHM 230 that is aware of using a dual-stack protocol by a requesting SE 110. Such embodiment of DSHM 230 can be configured to communicate with one or more servers of the ANOP 130 in order to obtain an indication that a certain SE 110 obtains two IP address, one over IPv4 and one over IPv6, in response to requesting an access to the Internet 140. An example server of the ANOP 130 can be the AGW 134. The communication with the internal servers of the ANOP 130 can be done over Remote-Authentication-Dial-In-User Service (RADIUS) protocol, for example. Other embodiment of DSHM can be configured to listen to the RADIUS communication over the ANOP 130 for a message that allocate one or more public IP address to one of the SE 110, for example. An example embodiment of DSHM 230 can be configured to store the allocated one or two public IP addresses in a SE table (SET) (not shown in the drawings).

The DSHM's task 400 can be initiated 402 when IPv6PP 200 is initiated and can be active as long as IPv6PP 200 is active. After initiation, DSHM 230 can allocate 404 resources for relevant elements of IPv6PP 200 that are needed for managing the dual-stack handshake. Resources such as but not limited to a timer Tw that can be used for postponing the SYN-ACK response over IPv4. Timer Tw can be clocked by one millisecond clock, for example. In addition storage resources can be allocated for storing the webservers tables (WST) 260, etc.

Next, at block 406 process 400 may check the queue of DSHM 230 looking for a 3WH packet. A next 3WH packet in the queue can be retrieved and parsed. Based on the source IP address a decision 410 can be made whether the packet was obtained from the AGW 134 or not. If 410 the packet was obtained from the AGW 134, then process 400 can proceed to block 460 at FIG. 4C in order to process the SE's 3WH packet.

If 410 the packet was not obtained from the AGW 134, which leads to the conclusion that the packet is a SYN-ACK that was sent by one of the webservers 150 in response to a SYN packet that had been sent by one of the SE 110. Then at block 412, based on the webserver IP address, the relevant entry of the WST 260 is retrieved. The entry can be parsed and a decision can be made 414 whether a dual stack was used by the requesting SE 110 while asking to set a connection with the relevant webserver. The dual stack process can be identified during obtaining the SYN packet from the SE 110 as it is disclosed below in conjunction with FIG. 4C.

If 414 the dual-stack process was not used, then at block 416, an ACK packet can be sent 416 toward the relevant webserver 150 over the appropriate channel, IPv6 or IPv4 channel. The ACK can be sent via IPv6-TCP stack 274, IPv6-network interface 284 and BGW 138b or the ACK can be sent via IPv4-TCP stack 272, IPv4-network interface 282 and BGW 138a. After sending the ACK the relevant entry in the WST 260 and HDB 250 can be updated with the date of the session and that the connection was successfully established over the relevant IPv4 or IPv6 network. Then, process 400 can return to block 406 for handling the next packet in the queue.

If 414 the dual-stack process was used, then a decision is made 420 whether the packet was obtained over IPv6 or not. If not, process 400 can proceed to block 440 in FIG. 4B. If the packet was sent over IPv6 network, then at block 422 a 3WH ACK packet can be sent toward the relevant webserver 150 via IPv6-TCP stack 274, IPv6-network interface 284 and BGW 138b.

Next, if a SYN-ACK had not been sent yet to the relevant SE 110 then a SYN-ACK can be sent 422 via client's-IPv6-TCP stack 224, IPv6-network interface 214 and AGW 134. The relevant entry in the WST 260 and the HDB 250 can be updated. The update can include the date, an indication that a connection over IPv6 was successfully established between that webserver and the IPv6PP 200. In some embodiments that counts the number of success trials to set a connection over IPv6 and or IPv4, the column that counts the number of success over IPv6 can be incremented by one. In addition, some embodiments of DSHM 230 in which probability values for success is used, then the value of probability can be updated 422. After the update, process 400 can return to block 406 for handling the next packet in the queue.

If 420 the packet was not sent over IPv6, which means that the packet was sent over IPv4, then a block 440 (FIG. 4B) the entry in the WST can be updated that a SYN-ACK was obtained over IPv4. The update can include the date, an indication that a connection over IPv4 was successfully established between that webserver and the IPv6PP 200. In some embodiments that counts the number of success trials to set a connection over IPv6 and or IPv4, the column that counts the number of success over IPv4 can be incremented by one. In addition, some embodiments of DSHM 230 in which probability values for success is used, then the value of probability can be updated 440.

After updating the relevant entry of WST 260 the timer Tw can be reset and process 400 can wait 442 until the value of timer Tw will be equal or greater than the value of WP. WP can be a configurable parameter in the range between 30-100 milliseconds, 50 milliseconds for example. At the end of the waiting period WP, the SYN-ACK can be transferred 452 toward the relevant SE 110 via the client's-IPv4-TCP stack 212, IPv4-network interface 212 and AGW 134 and process 400 returns 456 to block 406 for handling the next packet in the queue.

Returning now to block 410, if the packet was obtained from the AGW 134, then at block 460 (FIG. 4C) a decision is made whether the 3WH packet is a SYN packet from a SE 110 or not. If 460 it is not a SYN packet, which means that the 3WH packet is the ACK response from the relevant SE 110 that terminates the 3WH sequence, then at block 462 the relevant entry in the WST 260 can be updated that the 3WH over the relevant network (IPV4 or IPv6) was terminated successfully. An indication can be written in the WST 260 that a connection between that SE 110 and the relevant webserver 150 over IPv4 or IPv6 was successfully established. In some embodiments that counts the number of success trials to set a connection over IPv6 and or IPv4, the column that counts the number of success over the relevant network can be incremented by one. After updating the entry process 400 can return 484 to block 406 for handling the next packet in the queue.

If 460 the 3WH packet is a SYN packet, then based on the source IP address, the SET can be searched 464 looking for an entry that is associated with the source IP address over the other IPv network. If the second entry also indicates that a SYN request was sent on the other network, IPv4 or IPv6, substantially on the same time. The same time can be during a period of an interval of less than few milliseconds, ten milliseconds for example. If both requests were sent almost during the same time it indicates that a dual stack is used by that SE 110, then such a an identification can be marked in both entries, the one that is associated with the IPv4 request and the one that is associated with the IPv6 request. Otherwise, a single connection can be marked.

Next based on the destination IP address the WST 260 can be searched 464 looking for an entry that is associated with that webserver. If 470 an entry does not exist, then the process proceeds to block 490 in FIG. 4D. If an entry exists, the entry is fetched and parsed 472. If 474 the entry indicates that a connection between IPv6PP 200 and the relevant webserver can be set over a single network, IPv4 or IPv6, then at block 480 a decision is made whether the request was send over the network that matches the single network.

Figure 4A:
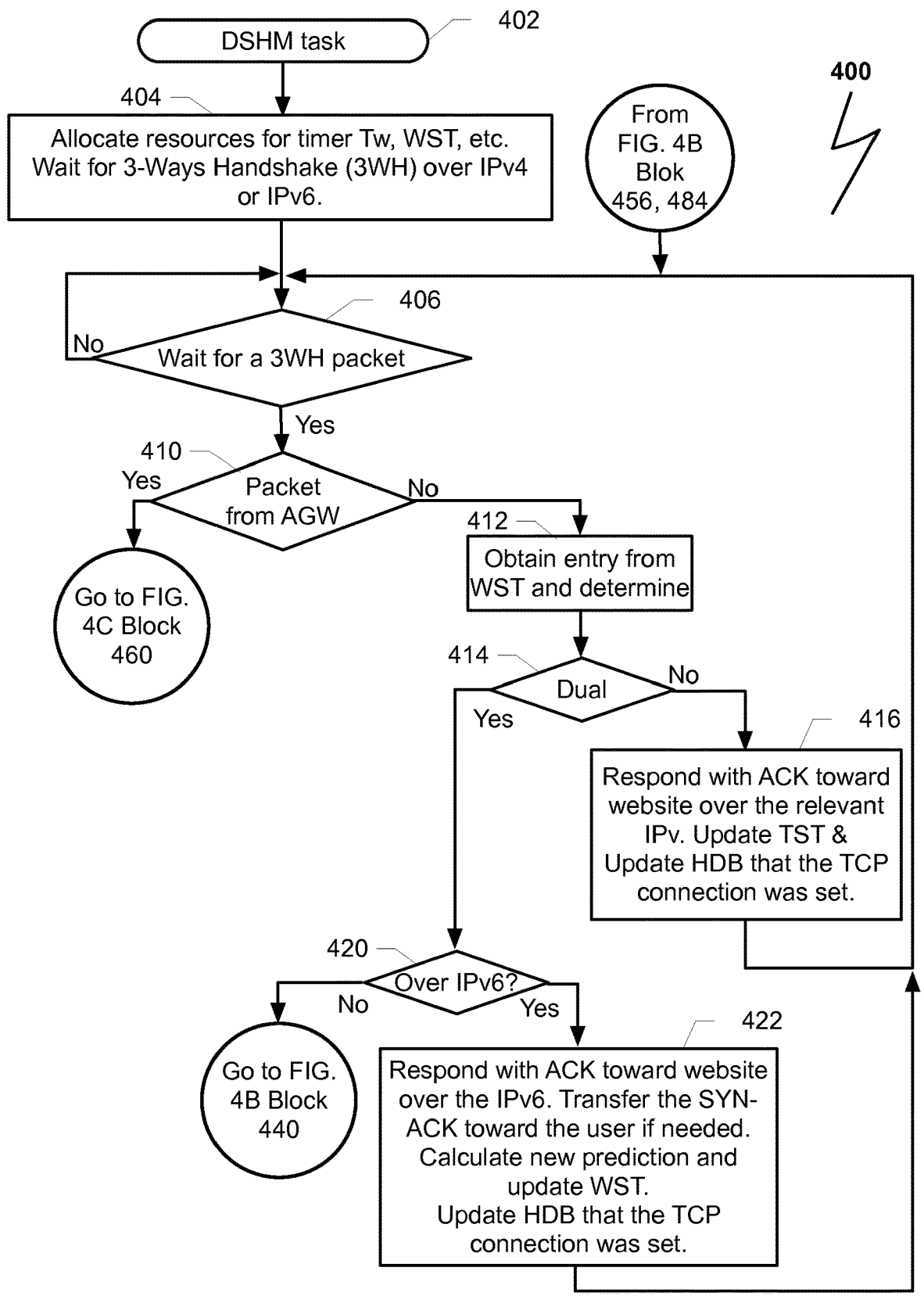
FIG. 4A-D illustrates a flowchart with relevant actions of a process that can be implemented by an example of a Dual-Stack-Handshake manager (DSHM) that is informed about a user that request access to the network almost simultaneously on IPv4 and IPv6.
Figure 4B:
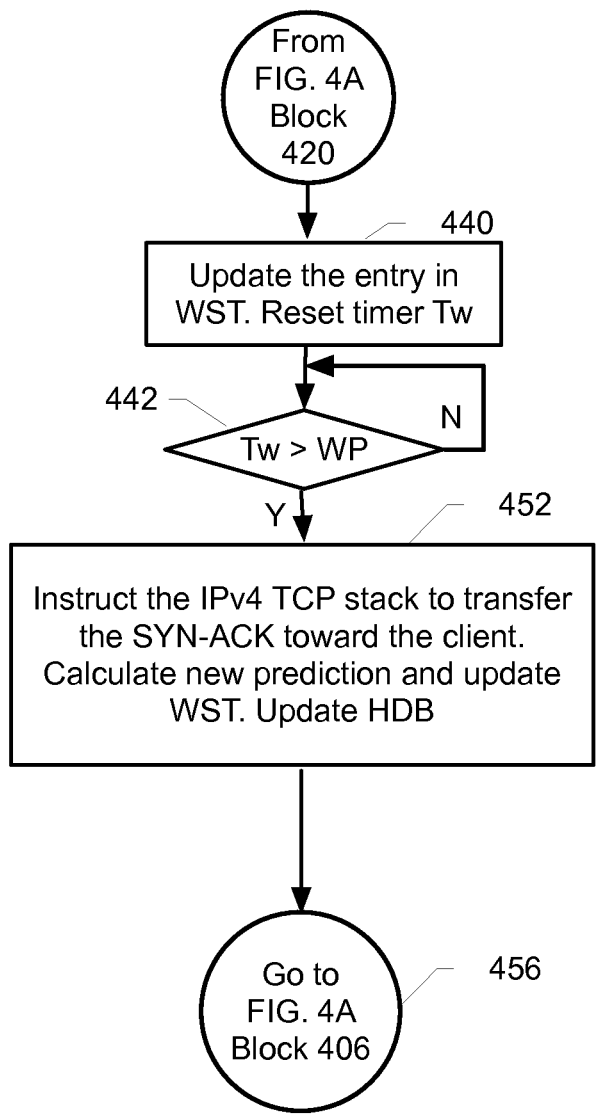
Figure 4C:
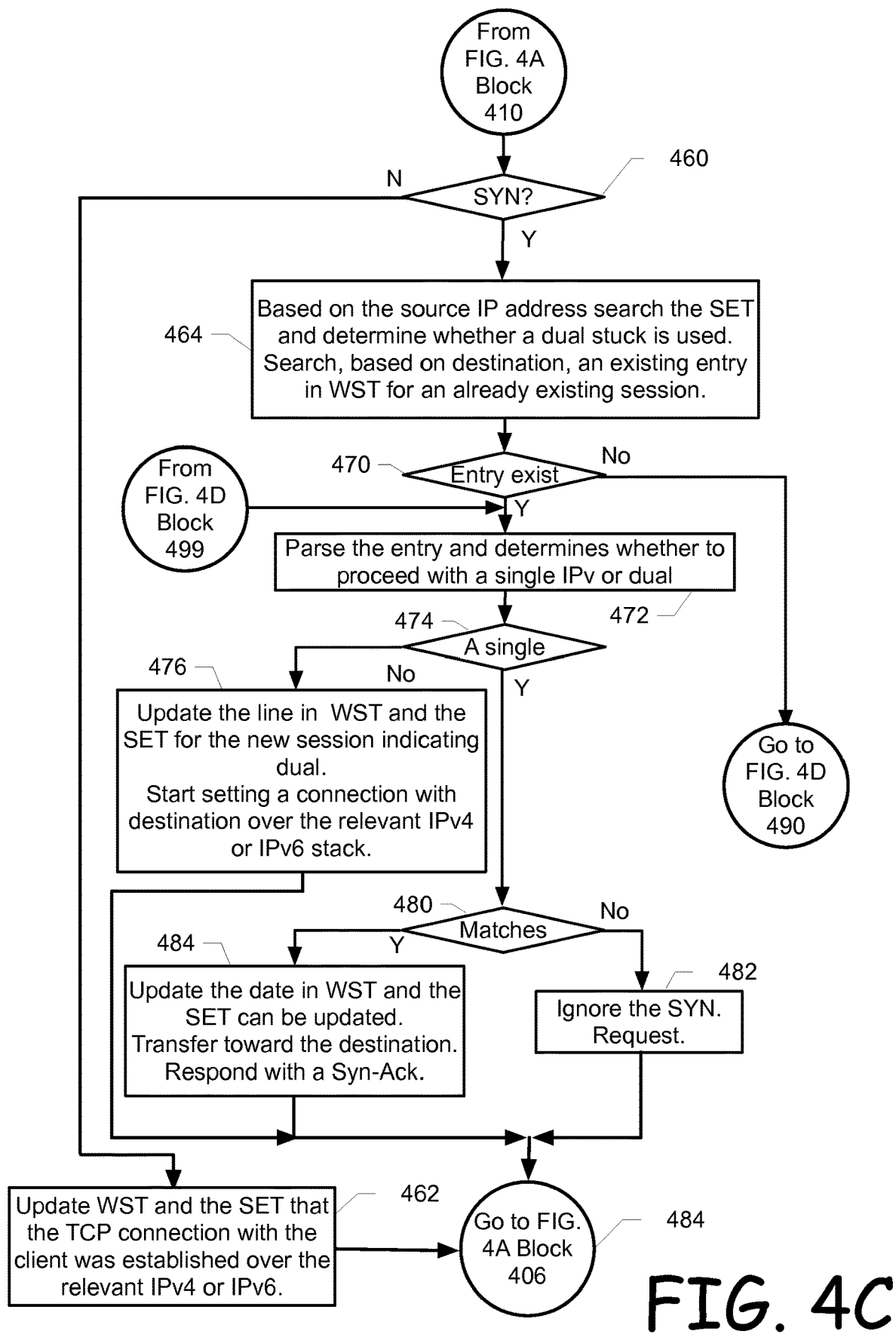
Figure 4D:
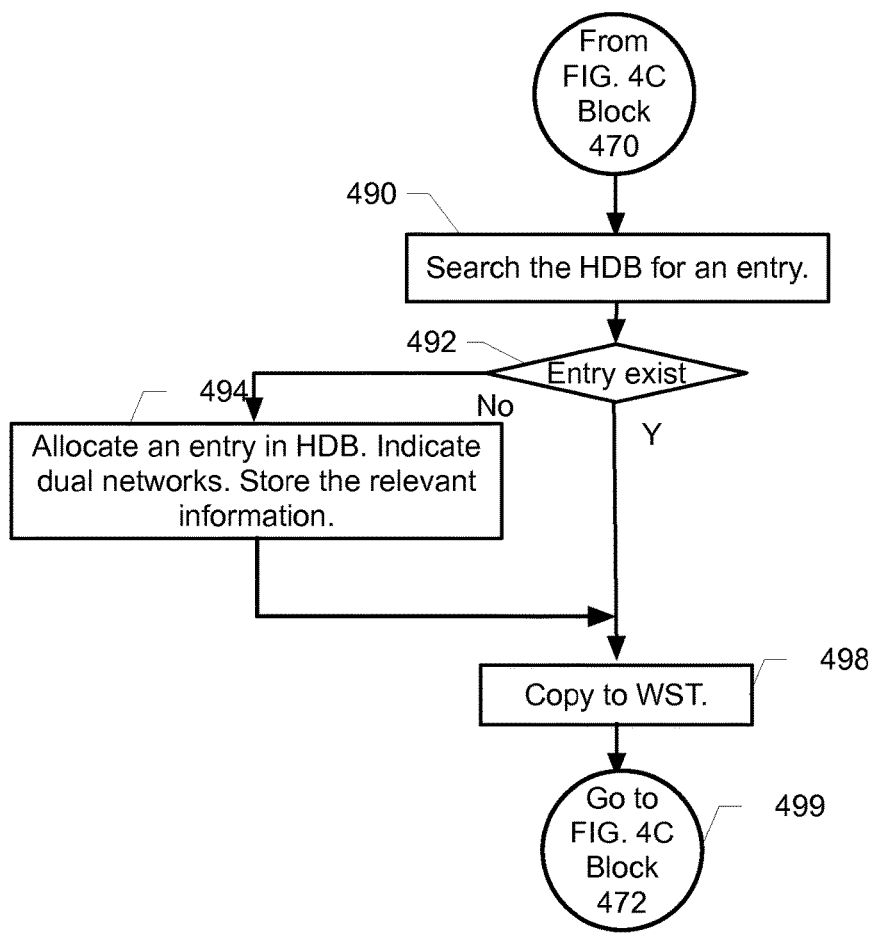

If 480 the request was sent over the other network than the one that is allowed in the entry of the WST 464, then at block 482 the SYN request can be ignored and process 400 returns to block 406 FIG. 4A. If 480 the request was sent over the network that matches the allowed network, then at block 484 the SYN request is transferred toward its destination and a SYN-ACK can be sent toward the requesting SE 110 and process 400 returns 484 to block 406. In parallel the entry in WST and SET can be updated.

Returning to block 474, if the entry indicates that a connection between IPv6PP 200 and the relevant webserver can be set by using the dual-network process over both IPv4 and IPv6, then at block 476 the relevant entry in the WST and the SET can be updated that a new session over a dual connection is requested. The IPv6PP 200 can start establishing 476 a connection with the relevant webserver over the appropriate IPv network out of the two networks, IPv4 or IPv6, that matches the destination address of the relevant request and process 400 can return 484 to block 406 (FIG. 4A).

If 470 an entry does not exist in the WST 260, then at block 490 (FIG. 4D) the HDB 250 (FIG. 2) can be searched 490 for an entry that matches the relevant destination IP address. If 492 an entry was found, then a new entry can be allocated to in the WST 260 and the content of the entry in the HDB can be copied to the new entry in the WST and process 400 can return to block 472 in FIG. 4C.

If 492 an entry was not found in the HDB 250 (FIG. 2), then a new entry can be allocated 494 to in the HDB and relevant information from the SE's request can be copied to the new entry in the HDB. Then, at block 498 the content of the entry in the HDB can be copied to the new entry in the WST and process 400 can return to block 472 in FIG. 4C. The relevant information from the SE's request can comprise the time, the destination address over IPv4 or IPv6, for example.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Many other ramification and variations are possible within the teaching of the embodiments comprising different combinations of features noted in the described embodiments.

It will be appreciated by persons skilled in the art that the present invention is not limited by what has been particularly shown and described herein above. Rather the scope of the invention is defined by the claims that follow.

What is claimed is:

1. A method for controlling three-way handshake, by a proxy server, while using dual-stack process, the method comprising:
   (a) employing, at a dual-stack proxy server that is communicatively coupled between a plurality of equipment and a plurality of webservers over a network that supports the IPv4 or IPv6 protocols, an historical database (HDB) that comprises a list-of-webservers wherein each entry in the list-of-webservers is associated with a webserver and comprises information related to the ability of the webserver to enter into a TCP connection using the IPv6 protocol over the network with the dual-stack proxy server;
   (b) obtaining, by the dual-stack proxy server and from a first equipment over the network using the IPv6 protocol, a first SYN packet that requests to establish a TCP connection using the IPv6 protocol over the network with a first webserver; and
   (c) checking, by the dual-stack proxy server, the list-of-webservers and calculating the probability of success to establish a connection over IPv6 between the proxy server and the first webserver over the network, and accordingly, the dual-stack proxy server determines whether to (1) send a first SYN-ACK packet toward the first equipment and send a second SYN packet over the network toward the first webserver using the IPv6 protocol, (2) send the second SYN request over the network toward the first webserver using the IPv4 protocol and (3) use a dual-stack protocol to collect more data while postponing sending a SYN-ACK packet toward the first equipment.

2. The method of claim 1, further comprising:
   obtaining, by the dual-stack proxy server and from a second webserver a second SYN-ACK packet over the network using the IPv4 protocol;
   waiting, by the dual-stack proxy server, a period of time and sending a 3rd SYN-ACK packet toward the destination of the second SYN-ACK over the network using the IPv4 protocol.

3. The method of claim 2, wherein the second SYN-ACK packet and the 3rd SYN-ACK packet are similar.

4. The method of claim 2, wherein the period of time is in the range of few tens of milliseconds.

5. The method of claim 4, wherein the period of time is in the range of 20 to 80 milliseconds.

6. The method of claim 5, wherein the period of time is 50 milliseconds.

7. The method of claim 1, wherein the first SYN packet and the second SYN packet are similar.

8. The method of claim 1, wherein the equipment is a smart phone.

9. The method of claim 1, wherein the information related to the ability of the proxy server to establish a TCP connection using the IPv6 protocol over the network with the first webserver comprises a predicting value that was obtained by calculating the probability of success in establishing a TCP connection between the proxy server and the first webserver using the IPv6 protocol over the network.

10. A non-transitory computer readable device containing executable instructions comprising instructions that when executed cause a processor, at a dual-stack proxy server that is communicatively coupled between a plurality of equipment and a plurality of webservers over IPv4 or IPv6 networks, to:
   a. employ an historical database containing a list-of-webservers wherein each entry in the list-of-webservers is associated with a webserver and comprises information related to the ability of the dual-stack proxy server to establish a TCP connection using an IPv6 protocol or an IPv4 protocol over a network with that webserver;
   b. the processor at the dual-stack proxy server obtain from a first equipment, using the IPv6 protocol over the network, a first SYN packet that requests establishing a TCP connection using the IPv6 protocol over the network with a first webserver; and
   c. the processor at the dual-stack proxy server check the list-of-webservers in the historical database and calculates the probability of success to establish a connection over IPv6 between the dual-stack proxy server and the first webserver over the network, and accordingly, the dual-stack proxy server determines whether to (1) send a first SYN-ACK packet toward the first equipment and send a second SYN packet using the IPv6 protocol over the network toward the first webserver, (2) send the second SYN request using the IPv4 protocol over the network toward the first webserver and (3) collect more data while postponing sending a SYN-ACK packet toward the first equipment using the processor at the dual-stack proxy server.

11. The non-transitory computer readable device of claim 10, wherein the executable instructions further comprising instructions that when executed cause:
   a. the processor at the dual-stack proxy server to obtain from a second webserver a second SYN-ACK packet using the IPv4 protocol over the network;
   b. the processor at the dual-stack proxy server to wait a period of time and then to send, using the IPv4 protocol over the network, a 3rd SYN-ACK packet toward the destination of the second SYN-ACK.

12. The non-transitory computer readable device of claim 11, wherein the period of time is in the range of few tens of milliseconds.

13. The non-transitory computer readable device of claim 10, wherein the computer readable device is selected from a group of devices containing read/write hard disc, CDROM, Flash memory and ROM.

* * * * *